April 18, 1939.   O. RÖHM ET AL   2,154,639

PROCESS FOR THE MANUFACTURE OF POLYMERIZATION PRODUCTS

Filed Dec. 4, 1935

INVENTOR.
Otto Röhm and
BY Walter Bauer

John F. Bergin
ATTORNEY.

Patented Apr. 18, 1939

2,154,639

UNITED STATES PATENT OFFICE 2,154,639

PROCESS FOR THE MANUFACTURE OF POLYMERIZATION PRODUCTS

Otto Röhm and Walter Bauer, Darmstadt, Germany, assignors to Röhm & Haas Company, Philadelphia, Pa.

Application December 4, 1935, Serial No. 52,782
In Germany December 6, 1934

11 Claims. (Cl. 18—58)

This invention relates to the manufacture of polymerization products and more particularly to the manufacture of these products in a form suitable for use as glass substitutes.

This application is a continuation-in-part of our copending application, Serial No. 748,472, filed October 16, 1934, which has matured into Patent No. 2,091,615. In that application a method is claimed for polymerizing unsaturated organic materials between sheets of glass in such a manner that a sheet of laminated glass is formed. In order to obtain a satisfactory laminated glass, it is necessary that the intermediate layer adhere very firmly to the glass. The present invention, on the other hand, relates to a process for polymerizing unsaturated organic material between two sheets of glass or of other suitable material in such a manner that after the polymerization is complete the glass or other material may be separated from the intermediate layer without disturbing the surface of the polymerized material, thus giving a product in which the surface of the material in contact with the polymer, whether highly polished or ground, is reproduced perfectly in the finished product. It is thus possible to obtain a polymerized material having a highly polished surface or one having a matt surface similar to that of ground glass or glass which has been etched with hydrofluoric acid.

It is an object of this invention to provide a method for the preparation of glass substitutes the surfaces of which are as highly polished as glass itself.

The materials which are suitable for this purpose must have sufficient strength and hardness. They may be obtained by polymerizing certain polymerizable unsaturated organic materials such as the esters of methacrylic acid, styrol etc. These may be polymerized singly or joint polymers of these compounds with other polymerizable unsaturated organic compounds such for instance as vinyl acetate or mixtures of polymerized materials containing the esters of methacrylic acid, styrol, etc., may be used. In addition to having the proper characteristics for a glass substitute such as strength, hardness, transparency etc. the polymerized material must also be capable of being easily removed from the mold after the polymerization is completed. If the main constituent is polymeric methyl-α-methacrylate or a mixture or joint polymer of this ester with ethyl-α-methacrylate, the amount of other polymerizable compound or compounds which may be added should in general not exceed 20–30 per cent. In adding materials such as plasticizers, other polymerizable materials, etc., to the substance to be polymerized care must be taken to keep the amount of these materials within such limits as will permit the process to be carried out, particularly with respect to the separation of the polymerized sheet from the mold without disturbing or marring the surface and also with respect to the strength and hardness of the final product. Certain oils may be added to the polymeric material which, after polymerization is complete, facilitate the removal of the polymer from the mold. When such oils are used, it is possible to incorporate larger amounts of plasticizer and still obtain usable products which may be easily separated from the mold.

Generally speaking the polymers suitable for glass substitutes according to the present invention are considerably harder than similar materials used in the preparatiton of laminated glass where adhesion to the glass is of paramount importance. The hardness of these materials may be varied somewhat by the use of plasticizers but in choosing these materials and in regulating the amount thereof care must be taken so that the hardness of the product is not reduced to such an extent as to render the material unsuitable for use as a glass substitute. Furthermore, the addition of plasticizers, such, for instance, as esters of phthalic acid, tends to increase the adhesion between the polymer and a glass plate and if too much is added it is impossible to obtain a perfect sheet by removing the glass from the polymer. This may be overcome by the addition of certain oils such as neat's-foot or a small amount of mineral oil. It also has been found that certain plasticizers, such, for instance, as tricresyl phosphate, have the property of reducing the adhesion between glass and the finished polymer. Experiments have shown that as much as 25 per cent. or more of plasticizer may be added to a suitable polymer if other materials are also added which tend to reduce the adhesion such, for instance, as the above-mentioned oils and in this manner it is possible to compensate for the increased adhesion due to the large amount of plasticizer.

Sheets of glass substitute may be readily prepared by polymerizing the monomeric material with or without other added materials such as plasticizers, coloring matter, etc., in a narrow cell, the main walls of which have highly polished surfaces or surfaces on which any desired design has been etched or surfaces which are completely etched or sandblasted so as to give a matt effect to the finished product. The material from which the walls of the cell may be made are metal or glass, preferably glass.

This invention may be practiced as follows:

Two sheets of glass are united at the edges by thin, narrow strips of an elastic material to which both sheets of glass adhere firmly. The glass may be of any desired shape. If it is square or rectangular, three sides are thus prepared; if circular or elliptical, the strip of elastic material is not fastened around the entire edge but a small space is left. In this way a narrow cell is formed which may be filled with the liquid to be polymerized. The two glass sheets may also be held in properly spaced relation by using thin discs of a plastic material, preferably of a polymer of the liquid to be subsequently polymerized in the glass cell. These discs may be placed at intervals between the sheets and fastened by means of an adhesive which is preferably a solution of the polymeric material. After the two sheets of glass have been fastened together in this manner, the edges are closed by a strip of elastic or flexible material such as paper in order to make a narrow cell leaving an opening through which the liquid to be polymerized may be poured. In either case the polymerization is carried out by heating the entire assembly to the desired temperature and for a period of time necessary to harden the material so as to form a suitable glass substitute.

The process is illustrated in the drawing in which—

Figure 1:
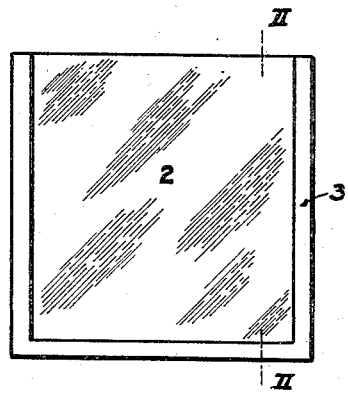
Fig. 1 is a plan view of square sheets of glass with a marginal strip of plastic material.
Figure 2:
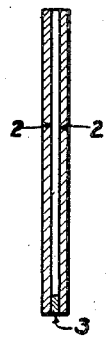
Fig. 2 is a cross-section on line II—II of Fig. 1.
Figure 3:
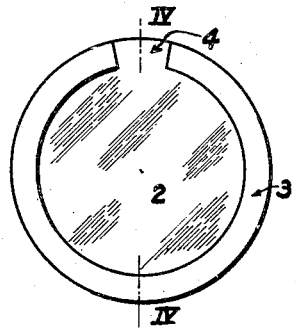
Fig. 3 is a plan view of circular glass sheets with a marginal strip.
Figure 4:
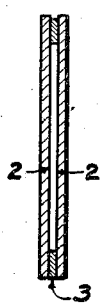
Fig. 4 is a cross-section on line IV—IV of Fig. 3.

Referring specifically to the drawing, Figs. 1-4, two glass sheets 2 of any desired size or shape are held together by a marginal strip 3 of plastic material. If the sheets are rectangular as in Fig. 1 the upper edge is left open and if round as in Fig. 3, the strip does not completely close, leaving an opening 4, through which the liquid to be polymerized may be poured.

Figure 5:
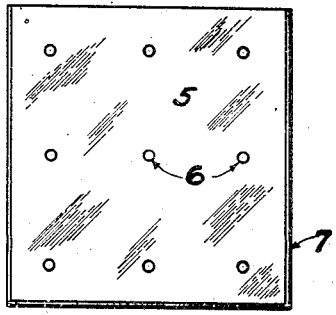
Fig. 5 is a plan view of two sheets of glass with spacing discs and paper-lined edge.

Fig. 5 illustrates the method when two glass sheets 5 are fastened together by plastic discs 6 and the edges sealed with strips of paper 7. Round glass sheets may also be used in this method.

The strips and discs may be of any desired thickness depending on the thickness of the finished slab.

The materials which may be polymerized between glass sheets as described above include polymerizable unsaturated organic compounds such as the esters of α-methacrylic acid, vinyl esters, styrol, etc. Plasticizers, coloring matter and catalysts may be added to the monomeric material before pouring it between the glass sheets. Mixtures of the above material and mixtures with other polymerizable unsaturated compounds, e. g., with vinyl esters, may also be used. Preferably the material is heated for a short time to a temperature near the boiling point of the monomer before the polymerization takes effect.

The plastic material used for the strips or discs is preferably a polymer of the same material used for the preparation of the glass substitute so that, when the polymerization is complete, the entire polymerized sheet is physically and optically homogeneous. Instead of the polymer other materials may be used for the marginal strips which are elastic and somewhat plastic, such as india rubber, paper or gelatin, especially in conjunction with softening agents. The india rubber should not contain any substances which interfere in any way with the polymerization. The marginal strips described may be replaced by small spacing blocks at the edges of the glass sheets which hold the sheets apart and by a strip of paper which overlaps and is glued upon the outsides of the sheets around the edges so as to make a closed cell.

In the preparation of laminated glass it is necessary that the material used for the intermediate layer adhere firmly to the glass but in the preparation of slabs or sheets of glass substitute by polymerizing the material between the sheets of glass it is essential that only those compounds or mixtures be used, which, when polymerized alone or in conjunction with other substances, do not stick to the glass or from which the glass may be removed without damage to the surface of the polymerized material. Such compounds are, for instance, styrol, esters of methacrylic acid such as methyl ester, ethyl ester, propyl esters, butyl esters, alone or joint polymerization products containing these compounds. Softening agents may be added to a considerable extent if desired, also coloring or darkening matter and catalysts. Substances which regulate the polymerization may be added also, for instance aldehydes, oil of turpentine, collophonium. Other substances modifying the properties of the products may be added, including cellulose compounds such as cellulose ether, cellulose triacetate and cellulose tripropionate. For the manufacture of polymerization products it is advantageous to heat the material to be polymerized to a temperature near the boiling point for a short time, a period of 2 to 30 minutes has been found convenient, and then to complete the polymerization at lower temperatures, at least 5° to 30° C. beneath the boiling point. For most compounds a temperature of 65° to 85° C. has been found advantageous. If desired, the materials may be subjected to a short heating in order to partially polymerize them before pouring into the mold.

During polymerization considerable contraction takes place and for this reason it is best to use molds which have movable walls. The plastic strips or discs which are used as spacers in the molds as described above permit a certain amount of movement of the sides of the mold. During the process of polymerization the material being polymerized adheres rather firmly to the glass and hence as it contracts will tend to draw the glass sheets closer together, thus preventing a separation of the polymerized material from the glass and the consequent formation of unevenness on the surface of the finished polymer.

In most instances the glass will separate readily from the polymerized product on cooling or on the application of slight force. The separation may be facilitated by placing the entire assembly in cold water and permitting it to stay there for a short time after which the glass will separate easily from the polymerized slab.

Instead of glass sheets, highly polished metallic sheets may be used.

The following examples will illustrate the invention which, however, is not limited to the exact material and conditions of polymerization shown.

*Example 1*

To ethyl-α-methacrylate is added a small amount of benzoyl peroxide. This mixture is heated 5 minutes at 100° C. and then poured into a cell 5 mm. wide, the main walls consisting of two rectangular plates of metal three edges of which are closed by a strip of polymerized material of the compound named which is 5 mm. thick and 5 mm. wide. In this cell the mixture is heated at 70° C. until polymerization is complete. After cooling, a slab 5 mm. thick is obtained, the surfaces of which are as highly polished as those of the metal plates with which it was in contact.

*Example 2*

To 74.5 parts of methyl-α-methacrylate 25 parts of butyl phthalate, 0.5 part of neat's-foot oil and a small amount of benzoyl peroxide are added. This mixture is poured into a cell 10 mm. wide, the main walls consisting of two rectangular sheets of glass three sides of which are closed by paper. The sheets of glass are held apart by means of small spacing blocks at the edges consisting of a mixture of 70 parts of gelatin and 30 parts of glycerin. After filling the cell the fourth side is also closed with paper. In this cell the mixture is heated for 15 minutes at 90° C. and further for 20 to 30 hours at 75° C. until polymerization is complete. The cell is then placed in cold water. After some time the polymerization product may be easily removed.

*Example 3*

50 parts of ethyl-α-methacrylate, 50 parts of methyl-α-methacrylate and a small amount of benzoyl peroxide are poured into a cell and treated as described in Example 2.

*Example 4*

80 parts of methyl-α-methacrylate, 18 parts of vinyl acetate, 2 parts of mineral oil and a small amount of benzoyl peroxide are poured into a cell and treated as described in Example 2. The resulting sheet has perfectly smooth surfaces but is translucent, due to the presence of the mineral oil.

*Example 5*

A mixture of 85 parts of monomeric methyl-α-methacrylate and 15 parts of isobutyl phthalate with a small amount of benzoyl peroxide as a catalyst is poured into a chamber or mold of the type described above. It is then heated for several hours at 80° C. during which time a contraction of the liquid takes place. After completion of the polymerization and cooling, the sheet of polymeric material may be readily separated from the glass. It is an excellent substitute for glass and has a perfectly smooth surface. In order to avoid breakage the cooling and separating of the parts may be done with the aid of water.

*Example 6*

Monomeric ethyl-α-methacrylate containing 0.1 per cent. of benzoyl peroxide is poured into a glass chamber as shown in Example 5 and then heated for 15 minutes at about 100° C. At the end of this time the ethyl-α-methacrylate should be partially thickened. If this is not the case, the heating at 100° may be continued. The temperature is then lowered to about 80° and held at that point for 10 to 20 hours. At the finish the temperature is raised for a few hours to 100° to 120° C. in order to assure complete polymerization. The mold is then cooled. The glass plates separate spontaneously from the sheet of polymer which may then be used as artificial glass. In case the glass and polymer do not separate, this may be brought about by placing the assembly in cool water. Generally the thicker the sheet of polymer the more easily is the glass separated from it.

*Example 7*

In place of the ethyl-α-methacrylate shown in Example 6 styrol may be used. The polymerization in this case usually requires about four days but by changing the conditions of polymerization, particularly the amount of catalyst, this time may be shortened.

*Example 8*

A mixture of 75 parts of methyl-α-methacrylate, 24 parts of dibutyl phthalate and 1 part of neat's-foot oil to which 0.1 per cent. of benzoyl peroxide is added is polymerized in a glass mold such as is described above. The polymer thus obtained is softer than those of the foregoing examples but still may be easily separated from the glass on account of the presence of the oil.

*Example 9*

A mixture of 95 parts of methyl-α-methacrylate and 5 parts of mineral oil containing 0.2 per cent. of benzoyl peroxide is polymerized in a similar manner. After cooling and removing the glass plates, a sheet is obtained which is cloudy and translucent but which still has a perfectly smooth surface.

*Example 10*

A mixture of 18 parts of vinyl acetate, 80 parts of methyl-α-methacrylate, 1 part of neat's-foot oil and 1 part of turpentine oil containing 0.5 per cent. of benzoyl peroxide is heated in a glass chamber for a short time at about 100° C. and then for 48 hours at 50° to 60° followed by 10 hours at 80° to 100° C. The resulting sheet separates readily from the glass and has perfectly smooth surfaces.

*Example 11*

A mixture of methyl-α-methacrylate containing 1 per cent. of neat's-foot oil and 0.05 per cent. of benzoyl peroxide may be polymerized between glass sheets in a similar manner.

*Example 12*

In place of the smooth glass sheets shown in the previous examples glass sheets which have been etched with hydrofluoric acid may be used and a material such as shown in Example 11 may be polymerized between two such sheets. The resulting sheet of polymer has a surface which corresponds exactly to that of the etched glass.

*Example 13*

In place of the etched glass sheets shown in Example 12 sheets of glass which have been sandblasted may be used resulting in a sheet of polymeric material having surfaces similar to those of ground glass.

The sheets of polymerized material obtained according to Examples 1 to 11 all have a very highly polished surface and are suitable for use as glass substitutes, particularly where light weight and transparency to ultra-violet light are important.

Sheets of polymerized material having a highly polished surface may also be obtained by pressing a preformed sheet of the polymerized material between two highly polished glass surfaces or metallic surfaces at an elevated temperature, cooling the entire assembly and removing the sheet of the polymer. In this way a sheet is obtained which reproduces exactly the surface of the material used in pressing the polymerized sheet. In case a matt effect is desired, the glass may be sandblasted, ground or etched with hydrofluoric acid before using.

It is also the subject of this invention to use plates of ordinary machine drawn glass instead of highly polished glass.

We claim:

1. The process of manufacturing glass substitutes which comprises forming a cell of two glass sheets held in spaced relation by flexible plastic spacers and having the edges of said cell sealed with a flexible material, the interior glass surfaces of said cell being highly polished, pouring a liquid ester of α-methacrylic acid capable of forming a transparent rigid polymer into the space between said sheets, heating said ester to effect polymerization, cooling the polymer while in contact with said polished glass surfaces and removing said sheets from the polymerized ester.

2. The process of manufacturing glass substitutes which comprises forming a cell of two glass sheets held in spaced relation by flexible plastic spacers and having the edges of said cell sealed with a flexible material, the interior glass surfaces of said cell being highly polished, pouring a liquid consisting of a mixture of a monomeric ester of α-methacrylic acid and another polymerizable unsaturated organic compound capable of forming a transparent rigid interpolymer into the space between said sheets, heating said mixture to effect polymerization, cooling the polymer while in contact with said polished glass surfaces and removing said sheets from the polymerized material.

3. The process of manufacturing glass substitutes which comprises forming a cell of two glass sheets held in spaced relation by flexible plastic spacers and having the edges of said cell sealed with a flexible material, the interior glass surfaces of said cell being highly polished, pouring methyl α-methacrylate into the space between said sheets, heating the methyl α-methacrylate to effect polymerization, cooling the polymer while in contact with said polished glass surfaces and removing said sheets from the polymerized ester.

4. The process of manufacturing glass substitutes which comprises forming a cell of two glass sheets held in spaced relation by flexible plastic spacers and having the edges of said cell sealed with a flexible material, the interior glass surfaces of said cell being highly polished, pouring a liquid consisting of a mixture of methyl α-methacrylate and another polymerizable unsaturated organic compound into the space between said sheets, heating said mixture to effect polymerization, cooling the polymer while in contact with said polished glass surfaces and removing said sheets from the polymerized material.

5. The process of manufacturing glass substitutes, which comprises forming a cell of two glass sheets held in spaced relation by plastic spacers and having the edges of said cell sealed with a flexible material, placing a liquid polymerizable organic material selected from the group consisting of methyl α-methacrylate, styrol, and mixtures thereof with other polymerizable organic materials in the space between said sheets, heating the organic material for from 2 to 30 minutes at a temperature near its boiling point, then polymerizing at a temperature 5 to 30° C. beneath the boiling point, and removing the said glass sheets from the polymerized material.

6. The process of manufacturing glass substitutes from liquid polymerizable esters of α-methacrylic acid that increase in density during polymerization and form transparent rigid polymers, which comprises forming a cell of two glass sheets held in spaced relation by plastic spacers and having the edges of said cell sealed with a flexible material, placing the polymerizable ester of α-methacrylic acid in the space between said sheets, heating the ester for from 2 to 30 minutes at a temperature near its boiling point, then polymerizing at a temperature 5 to 30° C. beneath its boiling point, heating at a temperature of from 100 to 120° C. to insure complete polymerization, and removing the said glass sheets from the polymerized material.

7. The process of manufacturing glass substitutes from liquid polymerizable methyl α-methacrylate which comprises forming a cell of two glass sheets held in spaced relation by plastic spacers and having the edges of said cell sealed with a flexible material, placing the polymerizable methyl α-methacrylate in the space between said sheets, heating the ester for from 2 to 30 minutes at a temperature near its boiling point, then polymerizing at a temperature 5 to 30° C. beneath its boiling point, heating at a temperature of from 100 to 120° C. to insure complete polymerization, and removing the said glass sheets from the polymerized material.

8. The process of manufacturing glass substitutes which comprises forming a cell of two sheets of material selected from the group consisting of metal and glass have prepared surfaces held in spaced relation by flexible plastic spacers and having the edges of said cell sealed with a flexible material, pouring a liquid polymerizable organic material selected from the group consisting of methyl-α-methacrylate, styrol and mixtures thereof with other polymerizable organic materials into the space between said sheets, heating the organic material to effect polymerization, cooling the polymer while in contact with said prepared surfaces and removing said sheets from the polymerizable material.

9. The process of manufacturing a glass substitute which comprises polymerizing a liquid ester of α-methacrylic acid capable of forming a transparent, rigid polymer by heating the liquid ester in a cell formed of two sheets of material selected from the group consisting of metal and glass, joined and sealed at their edges in spaced relation by flexible material capable of permitting the said sheets to move toward each other as the ester of α-methacrylic acid contracts during polymerization, cooling the polymer while in contact with said sheets, and removing the sheets from the polymerized material.

10. The process of manufacturing a glass substitute which comprises polymerizing liquid styrol by heating the liquid styrol in a cell formed of two sheets of material selected from the group consisting of metal and glass, joined and sealed at their edges in spaced relation by flexible material capable of permitting the said sheets to move toward each other as the styrol contracts during polymerization, cooling the polymer while in contact with said sheets, and removing the sheets from the polymerized material.

11. The process of manufacturing glass substitutes which comprises polymerizing a liquid ester of α-methacrylic acid capable of forming a transparent, rigid polymer by heating the liquid ester in a cell formed of two metal sheets, joined and sealed at their edges in spaced relation by a flexible material capable of permitting the said sheets to move toward each other as the ester of α-methacrylic acid contracts during polymerization, cooling the polymer while in contact with said sheets, and removing the sheets from the polymerized material.

OTTO RÖHM.
WALTER BAUER.